US009776730B1

(12) United States Patent
Leon et al.

(10) Patent No.: US 9,776,730 B1
(45) Date of Patent: Oct. 3, 2017

(54) INDEPENDENTLY OPERABLE FLIGHT DATA CAPTURE AND TRANSMISSION DEVICE

(71) Applicants: Ruben Leon, Oviedo, FL (US); Ananda Leon, Oveido, FL (US)

(72) Inventors: Ruben Leon, Oviedo, FL (US); Ananda Leon, Oveido, FL (US)

(73) Assignee: Levil Aviation, Oviedo, FL (US)

( * ) Notice: Subject to any disclaimer, the term of this patent is extended or adjusted under 35 U.S.C. 154(b) by 0 days.

(21) Appl. No.: 15/437,252

(22) Filed: Feb. 20, 2017

Related U.S. Application Data

(60) Provisional application No. 62/332,034, filed on May 5, 2016.

(51) Int. Cl.
| | |
|---|---|
| *G05D 1/00* | (2006.01) |
| *B64D 43/02* | (2006.01) |
| *G07C 5/00* | (2006.01) |
| *G07C 5/08* | (2006.01) |
| *G01P 13/02* | (2006.01) |
| *G01S 19/01* | (2010.01) |
| *G01P 5/16* | (2006.01) |

(52) U.S. Cl.
CPC ............... *B64D 43/02* (2013.01); *G01P 5/16* (2013.01); *G01P 13/025* (2013.01); *G01S 19/01* (2013.01); *G07C 5/008* (2013.01); *G07C 5/085* (2013.01)

(58) Field of Classification Search
CPC .......... B64D 43/02; G01P 5/16; G01P 13/025
See application file for complete search history.

(56) References Cited

U.S. PATENT DOCUMENTS

| 6,349,898 B1* | 2/2002 | Leonard | ................. F41G 7/007 244/3.11 |
| 2017/0012813 A1* | 1/2017 | Skaaksrud | .............. H04L 41/12 |
| 2017/0069214 A1* | 3/2017 | Dupray | ................ G08G 5/0021 |

* cited by examiner

*Primary Examiner* — Adam Alharbi
(74) *Attorney, Agent, or Firm* — Jason T. Daniel; Daniel Law Offices, P.A.

(57) ABSTRACT

An independently operable flight data capture and transmission device includes an aerodynamically efficient main body having a mounting bracket for securing the device onto the wings, fuselage or strut of an aircraft during flight. A sensor suite is positioned within the main body to independently capture flight data information pertaining to the flight characteristics, statistics, metrics, performance and environment of the aircraft during flight. A control unit is positioned within the main body to selectively control an operation of the sensor suite, store the flight data information within a memory and communicate with a user device. A mobile application displays the flight data information and communicates operating instructions to the device, and a power generation unit generates power for use by the system components during flight.

17 Claims, 5 Drawing Sheets

INDEPENDENTLY OPERABLE FLIGHT DATA CAPTURE AND TRANSMISSION DEVICE

CROSS-REFERENCE TO RELATED APPLICATIONS

This application claims the benefit of U.S. Application Ser. No. 62/332,034 filed on May 5, 2016, the contents of which are incorporated herein by reference.

TECHNICAL FIELD

The present invention relates generally to aircraft flight information systems, and more particularly to an external flight data pod for capturing and sharing flight data information.

BACKGROUND

The statements in this section merely provide background information related to the present disclosure and may not constitute prior art.

Unlike commercial aircraft which are loaded with advanced avionics, navigation systems and flight data recorders, most light aircraft are not required to carry such equipment. Indeed, many of the most popular light aircraft used today are manufactured with relatively rudimentary panel-mounted instrument packages such as analogue altimeters, directional gyro, airspeed indicator, and artificial horizon, for example.

As such, aircraft owners and operators often augment these instruments with any number of other commercially available Attitude/Heading Reference Systems (ADAHRS) and/or secondary components such as GPS navigation systems, autopilot systems, and/or multi-function flight computers, for example. Such systems are also designed to be mounted within the aircraft instrument panel, so as to provide real-time information to the pilot during a flight.

Although these systems work well for their intended purpose, there does not currently exist a convenient and cost effective way to combine and store all of this flight data information for analysis and/or playback after the flight has concluded. Although some of the above noted systems may include connection ports for individually mating with a tablet or other such device, the primary certified instruments do not include this ability, as doing so may cause a malfunction to a critical instrument.

Accordingly, it would be beneficial to provide a flight data pod that is capable of independently capturing flight data information for later reproduction and analysis. Such a feature being particularly beneficial for flight schools in evaluating the flight performance of students and/or for general aviation organizations in determining and scheduling aircraft maintenance, without the need to access the aircraft's primary instrumentation panel.

SUMMARY OF THE INVENTION

The present invention is directed to an independently operable flight data capture and transmission device, referred to hereinafter as a flight data pod. One embodiment of the present invention can include an aerodynamically efficient main body having a front end, a back end, a middle section and an interior space. A mounting bracket can extend outward from the main body, and can include any number of attachment fittings for securing the pod onto the wings, fuselage or strut of an aircraft during flight.

Another embodiment of the present invention can include a sensor suite that is positioned within the main body to capture flight data information. The flight data information can include any and all information pertaining to the flight characteristics, statistics, metrics, performance and/or environment of the aircraft during flight.

Yet another embodiment of the present invention can include a control unit that is positioned within the main body. The control unit can function to selectively control an operation of the sensor suite, store the flight data information within a memory and communicate with a user device. The user device may be provided with a mobile application for displaying the flight data information and communicating operating instructions to the pod.

Yet another embodiment of the present invention can include a power generation unit having a generator, a shaft and a blade assembly. The power generation unit can function to generate power for use by the system components during device operation.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

FIGS. 1-5 illustrate various embodiments of a flight data pod 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "top end," "bottom end," "right," "left," "front," "vertical," "horizontal," and derivatives thereof shall relate to the invention as oriented in FIG. 1.

Figure 1:
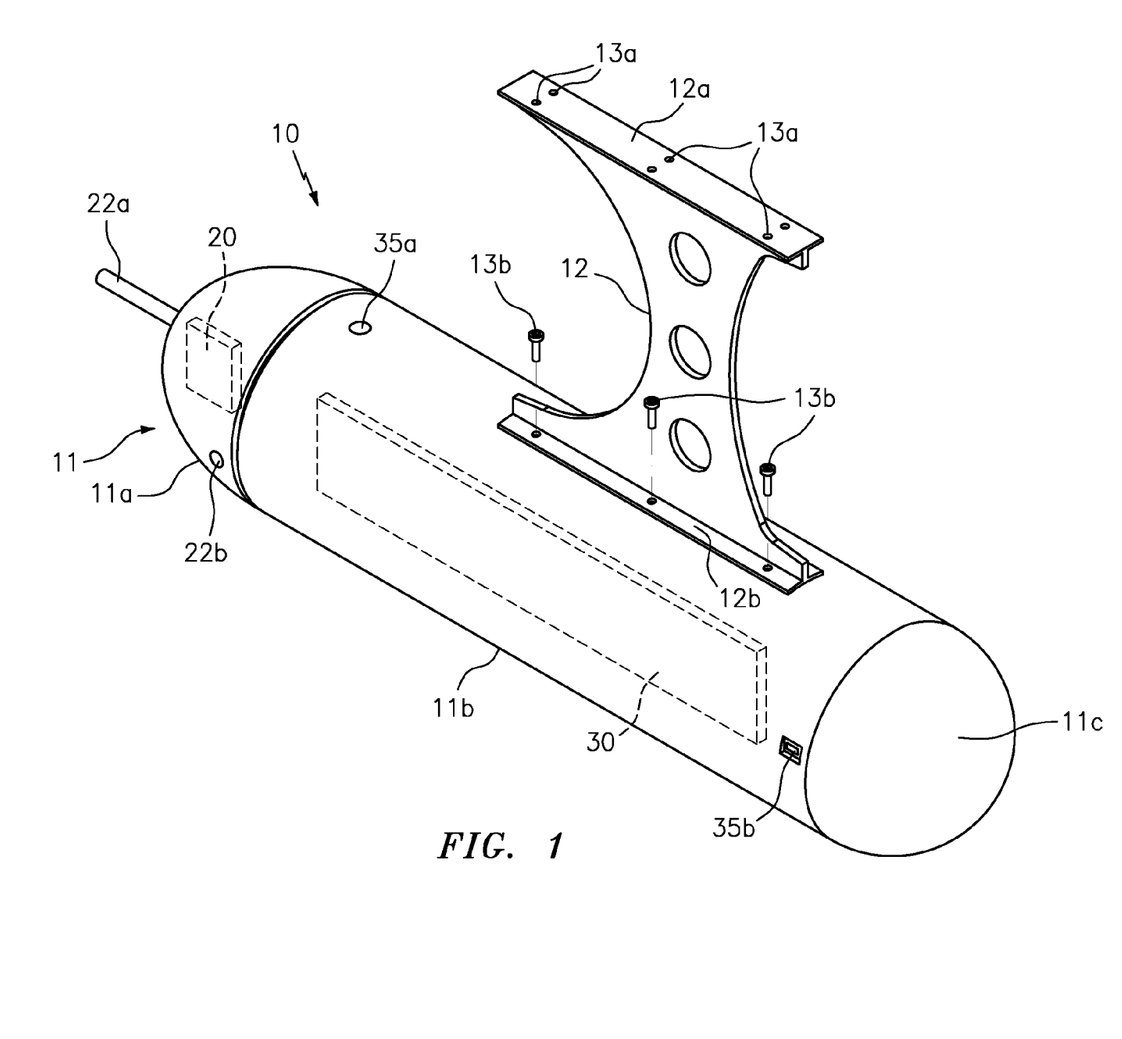
FIG. 1 is a side view of the flight data pod that is useful for understanding the inventive concepts disclosed herein.

FIG. 1 illustrates one embodiment of the flight data pod 10. As shown, the pod can include a main body 11 having a front end 11a, a middle section 11b and a back end 11c, each defining a generally hollow and waterproof interior space for housing the sensor suite 20 and control unit 30 described below. The main body can include any number of different shapes and sizes, such as the illustrated aerodynamically efficient teardrop shape, for example, and can be constructed as either a unitary element or can include one or more removable section(s) to allow access to the interior space.

A mounting bracket 12 can extend outward from the main body 11, and can include any number of attachment fittings 13a and 13b along the distal 12a and proximal 12b ends thereof. The mounting bracket can include any number of different shapes and sizes, and can function to secure and align the pod 10 along the longitudinal axis of the aircraft. In various embodiments, the mounting bracket can include a fixed shape and/or can be adjustable in nature. The mounting bracket can be removably or permanently affixed to the main body at any number of different positions so as to allow the pod 10 to be mounted onto an aircraft at locations such as above the wings, below the wings, and/or along the side of the fuselage, for example. In other embodiments, the mounting bracket can be formed into the construction of the main body 11, so as to form a unitary element.

As described herein, the attachment fittings can include or comprise any number of different elements capable of securing two items together in either a permanent or a nonpermanent manner. In the preferred embodiment, the attachment fittings 13a can include one or more apertures having a shape and size that are suitable for receiving the screw(s) of the jack hardpoints of the aircraft itself, so as to allow the pod to be securely mounted onto the aircraft jack hardpoints. Moreover, attachment fittings 13b can preferably include quick connect elements such as one or more spring latches, and/or bolt and wingnuts, for example, in order to allow the main body to be easily and quickly separated from the mounting bracket. Such a feature being advantageous for allowing a user to store the pod during non-use and/or to recharge the onboard batteries.

Of course, other embodiments are contemplated wherein the mounting bracket includes or comprises attachment fittings 13a and/or 13b that are different from those described above. As such, several nonlimiting examples of other suitable attachment fittings include any type of compression fittings such as clamps and tethers (used best for wing strut mounting), magnetic elements, and hardware such as screws nuts and bolts, for example.

In either instance, the main body 11 and bracket 12 can each be constructed from any number of different materials such as various plastics, composite materials and/or metals, for example, that do not interfere with the operation of the below described sensor suite, and that are suitable for prolonged exposure to airborne conditions such as high winds, rain, snow and ice, for example.

The flight data pod can function to capture and store flight data information which can be retrieved by a user for real time or later analysis. As described herein, flight data information can include, but is not limited to any and all information pertaining to the flight characteristics, statistics, metrics, performance and/or environment of an aircraft during flight. In this regard, the flight data pod can independently capture and store information that would ordinarily be displayed on one or more cockpit instruments such as: airspeed, altitude, angle of attack, roll, pitch, attitude, heading, rate of turn, bank, G-force, slip, vertical speed, longitude, latitude, GPS navigation information, non-satellite navigation coordinates, track, time, radio information (e.g., voice, ADS-b, squawk), and/or outside air temperature, for example.

Figure 2:
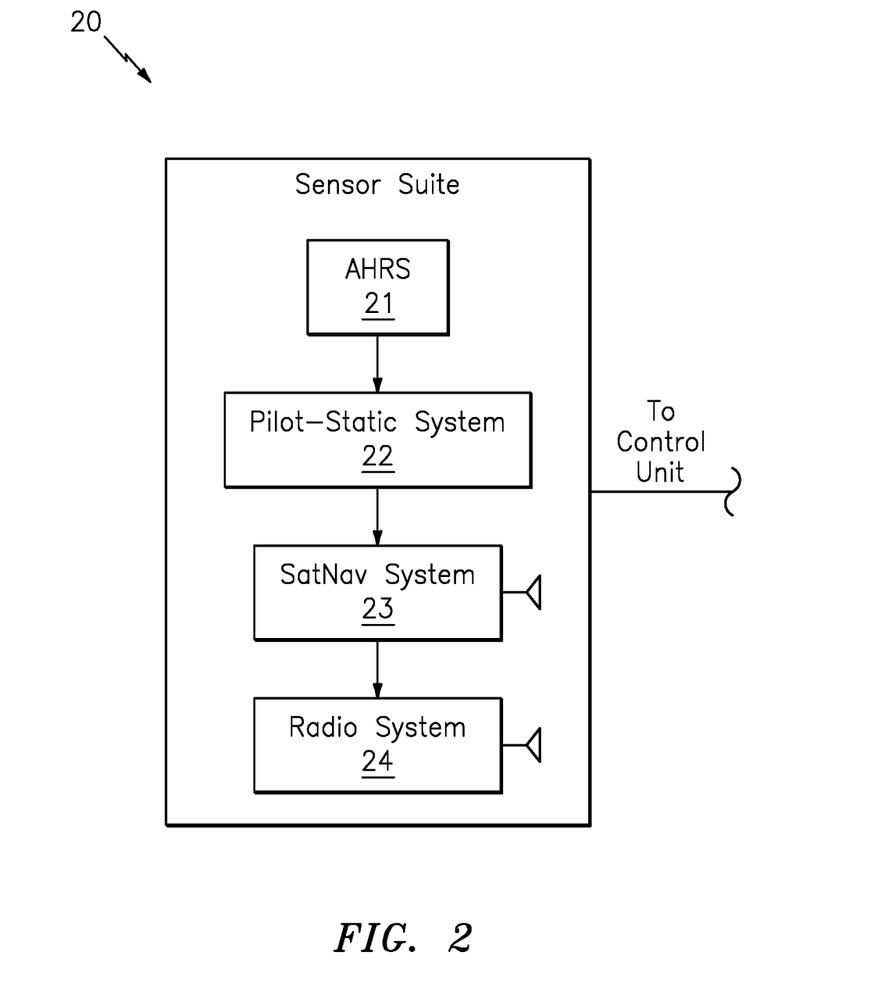
FIG. 2 is a simplified block diagram of the sensor suite of the flight data pod, in accordance with one embodiment of the invention.

In order to capture the flight data information, the pod 10 can include any number of individual sensors and/or sensor systems referred to collectively as a sensor suite 20. FIG. 2 is a simplistic block diagram illustrating an exemplary sensor suite suitable for capturing flight data information as described above. As shown, the sensor suite 20 can include an Attitude and Heading Reference System (AHRS) 21; a pitot-static system 22; a satnav system 23; and/or various radio systems 24, for example.

The AHRS 21 can include any number of solid-state or microelectromechanical systems gyroscopes, accelerometers and magnetometers on all three axes, to provide attitude information for aircraft, including roll, pitch and yaw, for example. One suitable example of an AHRS for use herein includes the AHRS-G micro that is commercially available from Levil Aviation; however any number of other systems can also be utilized.

The pitot-static system 22 can include any number of pressure sensitive instruments such as pitot tubes 22a and static ports 22b along with internal pressure chambers (not illustrated) to determine the aircrafts airspeed, altitude, altitude trend and/or angle of attack, for example. Although the drawings illustrate a pitot tube 22a extending outward from the front end of the main body, this is for illustrative purposes only. To this end, other embodiments are contemplated wherein the pitot tube is located within the main body, and air is supplied thereto via an opening along the main body to receive air.

One suitable example of a dual purpose pitot system for use herein includes the AOA/Pitot probe PN 10-02158 that is commercially available from Dynon Avionics; however any number of other systems and components can also be utilized herein. To this end, many other embodiments are contemplated wherein the pitot tube itself is replaced and/or augmented with any number of other components capable of performing the described functionality.

The satnav system 23 can include any number of different components for capturing location information utilizing one or more satellites. To this end, the system 23 can access one or more systems such as the Global Positioning System (GPS), Galileo, Beidou, and/or GLONASS, for example. The use and operation of satellite navigation systems are well known in the art, and typically require a signal antenna and one or more processing modules to receive and determine time and location information.

The radio system 24 can include any number of different radios and/or transponders suitable for capturing and/or transmitting signals. As such, the radio system can include one or more VHF radios for capturing and recording voice and/or weather communications, and/or one or more transceivers for receiving and/or broadcasting information such as squawk codes and ADS-B information, for example. Of course, any number of other devices capable of capturing this or related information can also be utilized herein.

The sensor suite 20 can be coupled to the below described control unit 30, so as to provide captured information thereto, and to receive operating instructions therefrom. To this end, the flight information data captured by each element of the sensor suite can be stored within the control unit for dissemination to a device user. Although described above as including specific sensors 21-24, this is for illustrative purposes only, as those of skill in the art will recognize that any number of different sensors can be utilized to capture any type of flight data information. Accordingly, the sensor suite is not limited to the type and/or number of individual sensors described above.

Figure 3:
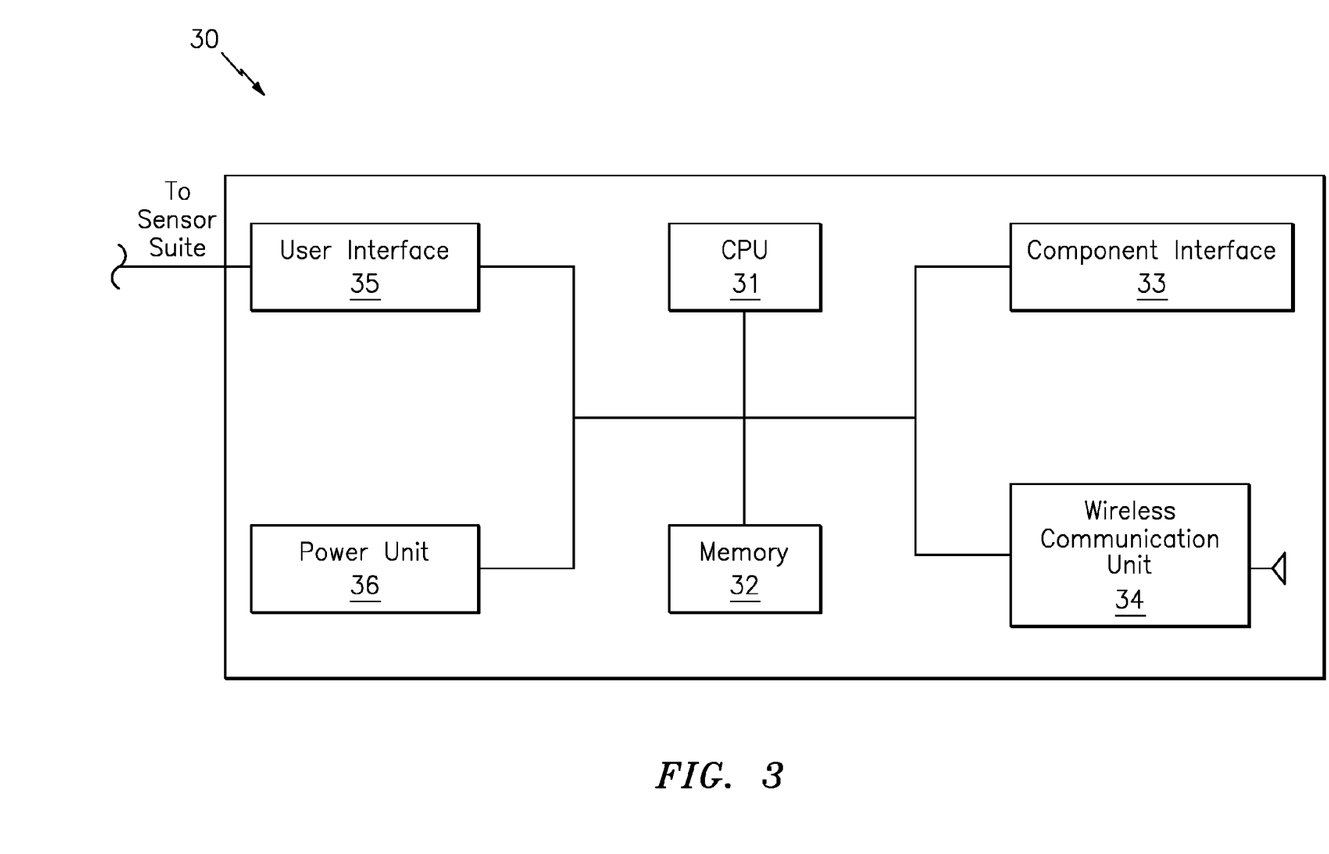
FIG. 3 is a simplified block diagram of the control unit of the flight data pod, in accordance with one embodiment of the invention.

FIG. 3 is a simplistic block diagram illustrating one embodiment of the control unit 30, which can control an operation of the sensor suite 20. As shown, the control unit can include a processing unit 31 that is conventionally connected to an internal memory 32, a component interface unit 33, a wireless communication unit 34, a user interface 35, and/or a power unit 36.

Although illustrated as separate elements, those of skill in the art will recognize that one or more system components 21-24 and/or 31-36 may comprise, or include one or more printed circuit boards (PCB) containing any number of integrated circuit or circuits for completing the activities described herein. The CPU may be one or more integrated circuits having firmware for causing the circuitry to complete the activities described herein. Of course, any number of other analog and/or digital components capable of performing the described functionality can be provided in place of, or in conjunction with the described elements.

The processing unit 31 can include one or more central processing units (CPU) or any other type of device, or multiple devices, capable of manipulating or processing information such as program code stored in the memory 32 in order to allow the device to perform the functionality described herein.

Memory 32 can act to store operating instructions in the form of program code for the processing unit 31 to execute. Although illustrated in FIG. 3 as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example. The bulk storage device can contain any number of different programs that permit the processor to perform the functionality described herein, such as controlling the operation of each element of the sensor suite 20, and for storing the flight data information received therefrom, for example. Additionally, memory 32 can also include one or more cache memories that provide temporary storage of at least some program code in order to reduce the number of times program code must be retrieved from the bulk storage device during execution. Each of these devices is well known in the art.

As is described throughout this document, the flight data pod is designed to independently capture, store and/or transmit flight data information. This information can be stored within the memory 32 and/or transmitted to an external device in any usable format so as to allow a user to retrieve and utilize the same in a variety of different manners. For example, the flight information data can be stored or transmitted in a format such as GPX, CSV and/or FDR, for example, that is suitable for use by any number of flight simulation programs and/or mapping programs. Such a feature allowing a user to replay their flights as a simulation during flight and/or after landing.

The component interface unit 33 can function to provide a communicative link between the processing unit 31 and various system elements such as the individual sensors of the sensor suite 20, for example. In this regard, the component interface unit can include any number of different components such as one or more PIC microcontrollers, standard bus, internal bus, connection cables, and/or associated hardware such as USB cables and connectors, and other such hardware capable of linking the various components. Of course any other means for providing the two way communication between the system components can also be utilized herein.

The communication unit 34 can include any number of components capable of sending and/or receiving electronic signals with another device, either directly or over a network. In one preferred embodiment, the communication unit 34 can include a WiFi transceiver for communicating wirelessly with an external device such as a user's smartphone, computer and/or tablet. Such a feature can allow a user to remotely control an operation of the flight data pod 10 and/or to wirelessly receive flight data information from the memory on demand.

In this regard, the App can function to generate any number of display screens such as a virtual cockpit, for example, that can display the flight data information in real time and/or after the flight has concluded. When used in real-time, the user can be provided with options for controlling the flight data pod, such as activating and/or deactivating individual sensors, for example.

Of course, the communication unit is not limited to the use of WiFi communication, as any number of other transmission and reception mechanisms and protocols can also be utilized herein. Several nonlimiting examples include Near-Field-Communication (NFC) devices, radio frequencies, infrared (IR), and/or via a network adapter functioning to communicate over WI-FI direct, WAN, LAN or the internet, for example. Additionally, the communication unit can include or comprise a Bluetooth transceiver which can supply the flight data information to a user's device through a mobile application (i.e., App) which can be downloaded onto the user device and installed as an application.

The user interface 35 can include or comprise any number of physical components capable of sending and/or receiving information with a user. In one embodiment, the user interface can include one or more buttons/switches 35a, for example, which can be located along the main body 11 and connected to the processing unit 31 so as to activate different programmatic functions. For example, one such button can act to initiate programming for instructing the processing unit 31 to transition the device between an ON and OFF operating state, initiate a sleep mode, and/or to pair the communication unit 34 with an external device, and so on. Additionally, the user interface can include or control one or more communication ports 35b, such as a Universal Serial Bus or micro USB port, for example, in order to send and receive information with another device via a direct communication link.

The power unit 36 can include any number of different components capable of providing the necessary power requirements to each element of the system. In various embodiments, the power unit can include or be connected to one or more batteries 36a, which can be located within the main body 11. In one embodiment, the batteries can be permanently located within the main body and can be rechargeable in nature via induction charging and/or a charging port such as the above described port 35b, for example. Of course, the batteries can be removable in nature via a battery compartment cover (not illustrated) for allowing a user to access the same.

Figure 4:
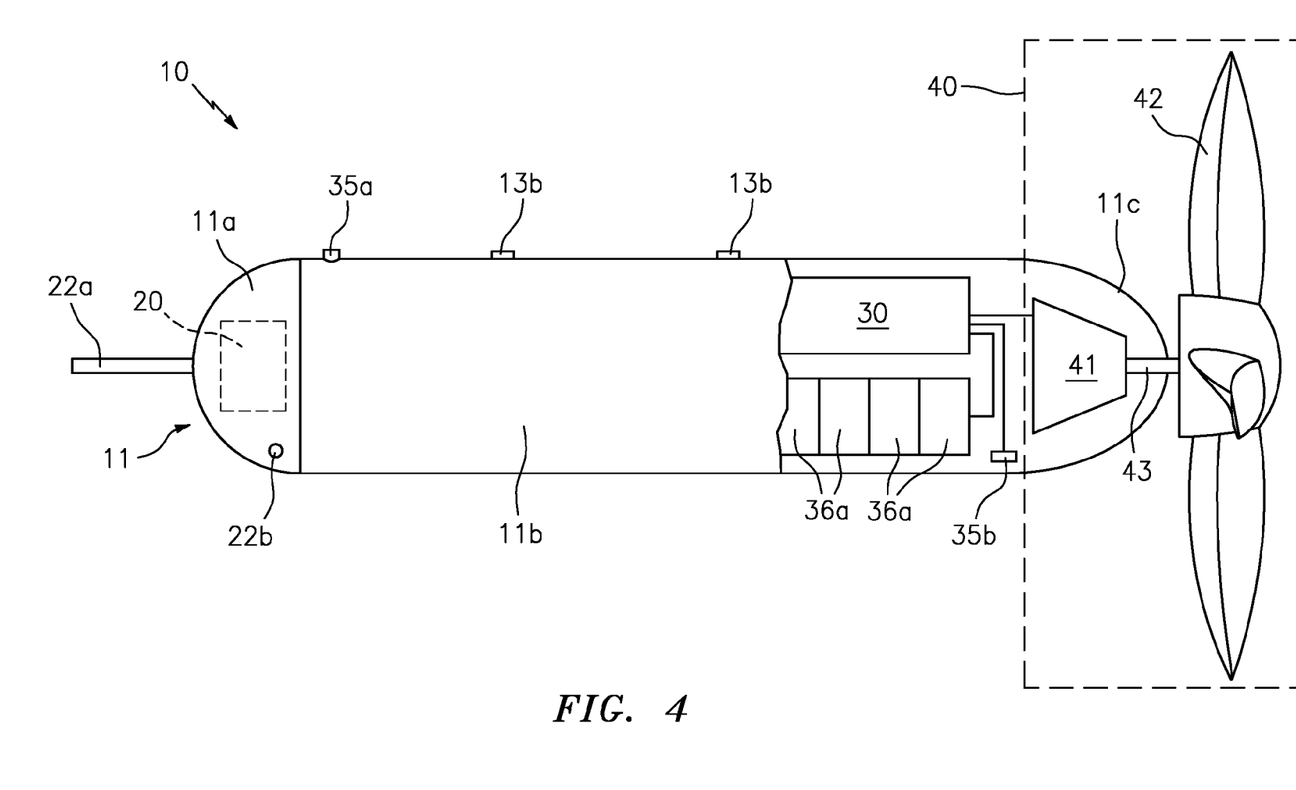
FIG. 4 is a partial cutout side view of the flight data pod, in accordance with one embodiment of the invention.

FIG. 4 illustrates one embodiment of the flight data pod 10 where the bracket 12 and a portion of the main body 11 are removed for ease of illustration. As shown, the flight data pod 10 can also include a power generation unit 40, which can function to generate usable power for storage by the batteries 36a and/or for direct use by the system components.

In the preferred embodiment, the power generation unit can include a brushless DC generator 41 that is connected to a rotating blade assembly 42 via a shaft 43 that traverses the back end of the main body 11c. The power generation unit can function in the expected manner, wherein during flight, airflow causes the blade assembly 42 and shaft 43 to spin. This mechanical force is transferred to the generator 41 where it is converted into electric energy. Although described as including specific components and locations along the main body, those of skill in the art will recognize that any number of other components and locations are contemplated so as to utilize airflow to generate power for the device components.

Figure 5:
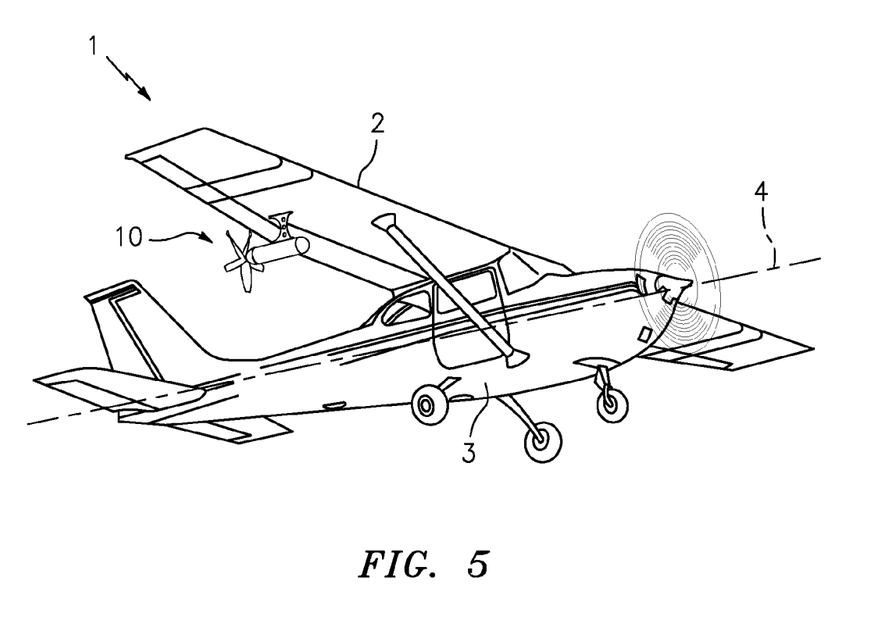
FIG. 5 is a perspective view of the flight data pod in operation, in accordance with one embodiment of the invention.

FIG. 5 illustrates one embodiment of the flight data pod 10 in operation. As shown, the pod 10 can preferably be mounted onto one of the wings 2 of an aircraft 1 having a fuselage 3, and a longitudinal axis 4. In the illustrated embodiment, the aircraft is a general aviation aircraft having a high fixed wing such as that sold under the trademark CESSNA; however, those of skill in the art will recognize that the data pod 10 can be utilized with any type of aircraft, and can be mounted to the same at any location that does not interfere with the safe operation of the aircraft.

Prior to, or during flight, a user can activate the sensor suite 20 via the above described user interface 35 or wireless user interface 34, respectively. In this regard, the user can instruct the control unit 30 to selectively activate any number of individual sensors of the sensor suite 20. Upon activation, the sensor suite can capture flight data information and store the same within the memory 32. This information can be immediately available to any user device via the wireless user interface 34, or can be downloaded after a flight via the wireless user interface and/or the communication port.

Accordingly, the above described flight data pod functions to independently capture and store any type of flight data information for immediate use and/or for later reproduction and analysis, without requiring a user to access the aircraft's primary instrumentation panel.

As described herein, one or more elements of the flight data pod 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An independently operable flight data capture and transmission device, comprising:
   a main body having a front end, a back end, a middle section and an interior space;
   a mounting bracket that is in communication with the main body, said mounting bracket including an attachment fitting that is configured to engage at least one of a wing, a fuselage and a strut of a manned aircraft having a primary pilot instrument panel;
   a sensor suite positioned within the main body, said suite functioning to independently capture flight data information of the manned aircraft to which the main body is secured; and
   a control unit that is positioned within the main body, said control unit functioning to control an operation of the sensor suite
   wherein the flight data information includes performance and flight characteristics that are simultaneously displayed on the primary pilot instrument panel of the manned aircraft.

2. The flight data device of claim 1, wherein the control unit further includes:
   a memory for storing the flight data information.

3. The flight data device of claim 1, wherein the control unit further includes:
   a wireless communication unit that is configured to transmit the flight data information to at least one of a tablet, a smartphone and a computer, both during and after a flight.

4. The flight data device of claim 3, wherein the wireless communication unit comprises a WiFi transceiver.

5. The flight data device of claim 1, wherein the flight data information includes each of an airspeed, an altitude, a climb rate, and a heading.

6. The flight data device of claim 1, wherein the flight data information includes satellite navigation information.

7. The flight data device of claim 1, wherein the flight data information comprises:
   radio information including voice, ADS-b and squawk.

8. The flight data device of claim 1, wherein the sensor suite includes an Attitude and Heading Reference System.

9. The flight data device of claim 1, wherein the sensor suite includes a pitot-static system.

10. The flight data device of claim 1, wherein the sensor suite includes a GPS navigation system.

11. The flight data device of claim 1, wherein the sensor suite includes a radio system.

12. The flight data device of claim 1, further comprising:
   at least one battery for providing power to each of the control unit and the sensor suite.

13. The flight data device of claim 12, further comprising:
   a power generation unit that is configured to generate power during flight for storage by the at least one battery.

14. The flight data device of claim 13, wherein the power generation unit comprises:
   a generator that is mechanically connected to a shaft and a blade assembly.

15. The flight data device of claim 14, wherein the shaft traverses the back end of the main body, and the blade assembly is positioned adjacent to the back end of the main body.

16. The flight data device of claim 1, wherein the main body includes an aerodynamically efficient teardrop shape.

17. The flight data device of claim 1, wherein the mounting bracket is removably connected to the main body.

* * * * *

(12) EX PARTE REEXAMINATION CERTIFICATE (11600th)
United States Patent
Leon et al.

(10) Number: US 9,776,730 C1
(45) Certificate Issued: Nov. 12, 2019

(54) INDEPENDENTLY OPERABLE FLIGHT DATA CAPTURE AND TRANSMISSION DEVICE

(71) Applicants: Ruben Leon, Oviedo, FL (US); Ananda Leon, Oveido, FL (US)

(72) Inventors: Ruben Leon, Oviedo, FL (US); Ananda Leon, Oveido, FL (US)

Reexamination Request:
No. 90/014,130, May 4, 2018

Reexamination Certificate for:
Patent No.: 9,776,730
Issued: Oct. 3, 2017
Appl. No.: 15/437,252
Filed: Feb. 20, 2017

Related U.S. Application Data

(60) Provisional application No. 62/332,034, filed on May 5, 2016.

(51) Int. Cl.
| | |
|---|---|
| *G05D 1/00* | (2006.01) |
| *B64D 43/02* | (2006.01) |
| *G07C 5/00* | (2006.01) |
| *G07C 5/08* | (2006.01) |
| *G01P 13/02* | (2006.01) |
| *G01S 19/01* | (2010.01) |
| *G01P 5/16* | (2006.01) |

(52) U.S. Cl.
CPC .............. *B64D 43/02* (2013.01); *G01P 5/16* (2013.01); *G01P 13/025* (2013.01); *G01S 19/01* (2013.01); *G07C 5/008* (2013.01); *G07C 5/085* (2013.01)

(58) Field of Classification Search
None
See application file for complete search history.

(56) References Cited

To view the complete listing of prior art documents cited during the proceeding for Reexamination Control Number 90/014,130, please refer to the USPTO's public Patent Application Information Retrieval (PAIR) system under the Display References tab.

*Primary Examiner* — Glenn K Dawson

(57) ABSTRACT

An independently operable flight data capture and transmission device includes an aerodynamically efficient main body having a mounting bracket for securing the device onto the wings, fuselage or strut of an aircraft during flight. A sensor suite is positioned within the main body to independently capture flight data information pertaining to the flight characteristics, statistics, metrics, performance and environment of the aircraft during flight. A control unit is positioned within the main body to selectively control an operation of the sensor suite, store the flight data information within a memory and communicate with a user device. A mobile application displays the flight data information and communicates operating instructions to the device, and a power generation unit generates power for use by the system components during flight.

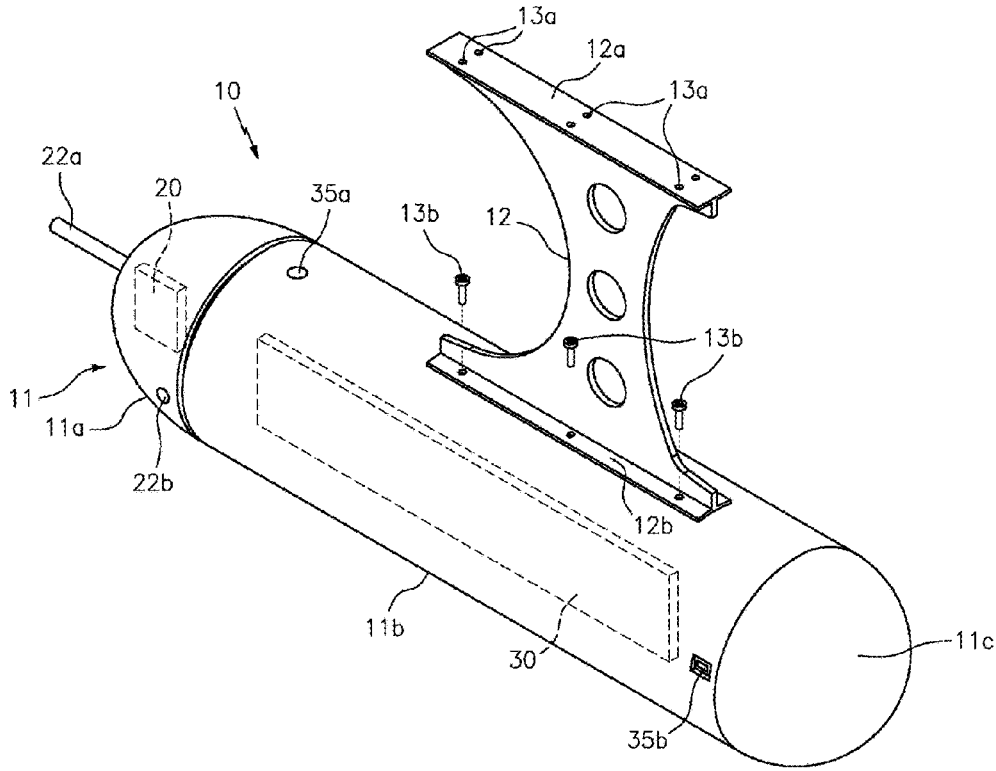

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 37-57:

Memory 32 can act to store operating instructions in the form of program code for the processing unit 31 to execute. Although illustrated in FIG. 3 as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive *or memory card*, for example. The bulk storage device can contain any number of different programs that permit the processor to perform the functionality described herein, such as controlling the operation of each element of the sensor suite 20, and for storing the flight data information received therefrom, for example. Additionally, memory 32 can also include one or more cache memories that provide temporary storage of at least some program code in order to reduce the number of times program code must be retrieved from the bulk storage device during execution. Each of these devices is well known in the art.

AS A RESULT OF REEXAMINATION, IT HAS BEEN DETERMINED THAT:

Claims 1-6, 8-12 and 16-17 are cancelled.

Claim 13 is determined to be patentable as amended.

Claims 7, 14 and 15 were not reexamined.

13. [The flight data device of claim 12, further] *An independently operable flight data capture and transmission device*, comprising:

a main body having a front end, a back end, a middle section and an interior space;

a mounting bracket that is in communication with the main body, said mounting bracket including an attachment fitting that is configured to engage at least one of a wing, a fuselage and a strut of a manned aircraft *having a primary pilot instrument panel*;

a sensor suite positioned within the main body, said suite functioning to independently capture flight data information of the manned aircraft to which the main body is secured;

a control unit that is positioned within the main body, said control unit functioning to control an operation of the sensor suite, at least one battery; and a power generation unit that is configured to generate power during flight for storage by the at least one battery,

*wherein the flight data information includes performance and flight characteristics that are simultaneously displayed on the primary pilot instrument panel of the manned aircraft.*

\* \* \* \* \*